United States Patent
Gough et al.

(10) Patent No.: US 7,627,183 B2
(45) Date of Patent: Dec. 1, 2009

(54) SYSTEM, METHOD AND ARTICLE OF MANUFACTURE FOR DECOMPRESSING DIGITAL CAMERA SENSOR DATA

(76) Inventors: Michael L. Gough, 8131 Harvard Dr., Ben Lomond, CA (US) 95005; Paul Miner, 1114 Pacific Ave., #407, Santa Cruz, CA (US) 95060

( * ) Notice: Subject to any disclaimer, the term of this patent is extended or adjusted under 35 U.S.C. 154(b) by 0 days.

(21) Appl. No.: 11/779,253

(22) Filed: Jul. 17, 2007

(65) Prior Publication Data
US 2008/0144948 A1    Jun. 19, 2008

Related U.S. Application Data

(63) Continuation of application No. 11/018,861, filed on Dec. 20, 2004, now Pat. No. 7,245,772, which is a continuation of application No. 09/626,012, filed on Jul. 26, 2000, now Pat. No. 6,850,647.

(60) Provisional application No. 60/146,522, filed on Jul. 30, 1999.

(51) Int. Cl.
*G06K 9/36*    (2006.01)
*G06K 9/46*    (2006.01)

(52) U.S. Cl. .................... 382/233; 382/234; 382/235; 382/303

(58) Field of Classification Search ................. 382/233, 382/234, 235, 303; 375/240.25
See application file for complete search history.

(56) References Cited

U.S. PATENT DOCUMENTS

| 5,434,913 A | * | 7/1995 | Tung et al. ............. 379/202.01 |
| 5,764,801 A | * | 6/1998 | Munemasa et al. .......... 382/234 |
| 5,826,073 A | * | 10/1998 | Ben-Meir et al. ........... 712/226 |

* cited by examiner

*Primary Examiner*—Phuoc Tran
(74) *Attorney, Agent, or Firm*—TIPS Group

(57) ABSTRACT

In example embodiments, a method, system and article for decompressing compressed video data in a processor having at least two pipelines, including obtaining a plurality of raw data bits from a compressed video data stream; extracting one or more components from the plurality of raw data bits by analyzing the plurality of raw data bits in a look-up table; and directing the components of the compressed video data into one of the pipelines for processing purposes based on the analysis. In another example embodiment an apparatus includes a microprocessor; memory; a communication adapter, capable of transmitting and receiving data over a communication network; a microphone, speaker, and a display device; and logic encoded in a tangible medium which when executed is operable to decompress compressed video data received from the communication network utilizing a look-up table.

8 Claims, 20 Drawing Sheets

SYSTEM, METHOD AND ARTICLE OF MANUFACTURE FOR DECOMPRESSING DIGITAL CAMERA SENSOR DATA

CROSS REFERENCE TO RELATED APPLICATION

This application is a continuation of U.S. patent application Ser. No. 11/018,861 filed Dec. 20, 2004, now U.S. Pat. No. 7,245,772, which is a continuation of U.S. patent application Ser. No. 09/626,012, filed Jul. 26, 2000, now U.S. Pat. No. 6,850,647, which claims the benefit of U.S. Provisional Patent Application No. 60/146,522, filed on Jul. 30, 1999, each of which applications is incorporated herein by reference. Additionally, this application is related to co-owned U.S. patent application Ser. No. 11/657,705, filed on Jan. 23, 2007, which is also incorporated herein by reference.

FIELD OF THE INVENTION

The present invention relates to digital processing of compressed video data and more particularly to decompressing a bit stream representative of a plurality of video frames generated by a digital camera.

BACKGROUND OF THE INVENTION

As shown in Prior Art FIG. 1, a digital camera system 100 typically includes a digital camera 102 having a sensor 104 aligned with a lens 105, where the sensor 104 is capable of generating video signals including a plurality of discrete images. A display 106 can be coupled to the digital camera 102 by a digital processing system 108. One function of a digital processing system 108 may be to decompress compressed video images for the purpose of efficient storage and communication.

Prior Art FIG. 2 shows an initial stage of compression of the video signals received from the exemplary digital camera 102. As shown, one of the images 200 is received from the sensor 104 of the digital camera 102 and is subsequently divided into a plurality of blocks 202, or portions, each having dimensions of 16×16 pixels. Thereafter, each of the blocks 202 are separated into three color components including blue, green and red color components 204a-c, respectively.

With continuing reference to Prior Art FIG. 2, the blue, green and red color components 204a-c of each block 202 are transformed into chrominance (Cb, Cr) and illuminance (Y) components 206a-c, respectively. This is accomplished by a matrix algorithm as will be appreciated by those skilled in the art. Next, the chrominance components 206a, 206b are compressed to the extent of the having dimensions of 8×8 pixels, i.e. half the dimensions of the illuminance component 206c. The illuminance component 206c is exempted from compression due to the sensitivity of the human eye to such color component.

Prior Art FIG. 3 is a subsequent step of processing wherein the illuminance component 206c is subdivided into four components each having dimensions of 8×8 pixels Altogether, a total of six parts are existent at this point in the processing for each component. The chrominance and illuminance components 206a-c are then processed by a discrete cosine transform (DCT) operation 300. The DCT operation 300 translates the pixel data of the chrominance and illuminance components 206a-c into corresponding spatial frequency data 302. This results in a 8×8 grid of spatial frequency numbers. As is conventional, low frequency data is positioned at an upper left hand portion of the 8×8 grid, high frequency data is positioned at a lower right hand portion of the 8×8 grid, horizontal frequency data is positioned at an upper right hand portion of the 8×8 grid, and vertical frequency data is positioned at a lower left hand portion of the 8×8 grid.

As shown in Prior Art FIG. 4, the spatial frequency data 302 is subsequently processed by a quantization operation 400, thus rendering scaled spatial frequency data 402, or quantized coefficients. This quantization operation 400 scales each of the spatial frequency data 302 of the 8×8 grid by a quantization factor in terms of importance when viewed by the human eye, For example, low frequency data is scaled differently than high frequency data since human vision is more sensitive to low frequency light.

With reference now to Prior Art FIG. 5, the scaled spatial frequency data 402 is then processed by a run length coding scheme 502. As shown, the numbers of the scaled spatial frequency data 402 are selected in a "zigzag" fashion, serialized, and subsequently encoded. When encoded, groups of zeros 504 are detected in the serialized scaled spatial frequency data 402 and are subsequently compressed. It should be noted that the high frequency data have a greater tendency to be subjected to such zero compression. This is because during the quantization operation, the high frequency data are quantized more, thereby resulting in lower numbers approaching zero.

Prior Art FIG. 6 shows a portion of the serialized bit stream of Prior Art FIG. 5 after the encoding operation 502 is carried out. As shown, the groups of zeros 504 are compressed and accompanied by a number 602 that is representative of the number of zeros. Together, the groups of zeros 504 and the number 602 form a "Huffman Group" 604. As will soon become apparent, the number 602 of the Huffman Group 604 becomes a coefficient in the resultant bit stream.

Such resultant bit stream is shown in Prior Art FIG. 7. As shown, the coefficients 700 are each accompanied by a command 702. This command 702 represents the number of preceding zeros in addition to the number of bits required to encode the number that follows. The length of each command 702 may be optimized by generating short commands 702 to cover common combinations of data and generating long commands 702 to cover unlikely combinations of data. The command thus has a variable-length.

With the image information now compressed, it is thus suitable for effective delivery to a desired location. Upon delivery, the image information must be decompressed. One decompression process of the prior art is shown in Prior Art FIG. 8. Upon starting in operation 800, 11 bits of raw data are obtained from the compressed bit stream in operation 802. Such 11 bits of raw data are then used to perform a look-up in a look-up table 805 in operation 804. An example of such look-up table 805 is shown in FIG. 8a. As shown, the look-up table includes a plurality of 2-byte data segments 807 each of which decodes different 11 bit segments of the raw data. For example, a 2-byte data segment may identify a command, a number of preceding zeros, and a coefficient following the command.

In operation 804, the 2-byte data segment that corresponds to the 11 bits obtained in operation 802 are retrieved. The information from the 2-byte data segment is then used to emit the number of zeros determined. Note operation 806. Next, the command may be consumed, or deleted, in operation 808. The coefficient specified by the 2-byte data segment is then decoded and emitted in operations 810 and 812, respectively. Thereafter, the bits of raw data that represent the coefficient are consumed in operation 814. Finally, it is determined in decision 816 whether any more bits of raw data remain. If so, the process of Prior Art FIG. 8 is repeated. If not, however, the process is terminated in operation 818.

It should be noted that the foregoing decompression scheme of Prior Art FIG. 8 includes a two-step method of processing both a DC code and a plurality of AC codes. As is well known by those of ordinary skill in the art, the DC code relates to an initial set of the bits representative of an image block while the AC codes relate to a plurality of subsequent set of the bits representing the image block.

The foregoing decoding process of Prior Art FIG. 8 thus depends on a unique data segment stored in a look-up table for every combination of bits of raw data obtained. This procedure can be very time consuming and thus result in a slow decoding time and lack of efficiency.

There is thus a need for decompressing a bit stream of compressed data representing a plurality of image blocks in a more expedited manner.

SUMMARY OF THE INVENTION

The present invention includes a system, method, and article of manufacture for decompressing a bit stream of compressed video data. In a preferred embodiment, the present invention includes a two-step method of processing both a DC code and a plurality of AC codes.

With respect to the processing of the DC code, a plurality of bits of compressed input data relating to the DC code are first obtained from the bit stream. Thereafter, a look-up is performed in a look-up table based on the obtained compressed input data. The look-up table includes a plurality of data segments each having output data therein. If the look-up is unsuccessful, at least one bit of the compressed input data is zeroed out and another look-up is performed. Next, a DC command component of the compressed input data is consumed. DC data is then retrieved from the compressed input data after which such DC data is converted to a signed integer. A DC coefficient component of the compressed input data is then processed and emitted to an alternate buffer. Finally, the compressed input data corresponding to the DC coefficient component of the compressed input data is consumed.

In terms of AC code processing, a plurality of bits of compressed input data relating to the AC codes are first retrieved from the bit stream. A first decoding operation is then executed based on the obtained compressed input data in order to generate first output data. It is then determined whether sufficient space is available for the first output data. If it is determined that there is sufficient space for the first output data, the first output data is outputted. If, however, it is determined that there is insufficient space for the first output data, an alternate second decoding operation is executed in order to generate second output data.

In order to carry out the foregoing decoding operations, a data structure is provided in a look-up table for being employed by an AC decoder during use. Such data structure includes a plurality of data segments each having a payload and a pointer. The payload includes a plurality of bits in one of a plurality of coding schemes. Further, the pointer corresponds to a routine which is capable of processing the coding scheme of the payload associated with the pointer.

The first decoding operation initially includes the operation of performing a look-up in the look-up table based on the obtained compressed input data. The pointer is then retrieved from one of the data segments that corresponds to the obtained compressed input data. Next, the process routine corresponding to the retrieved pointer is executed. The payload is then processed in the executed routine in order to generate the first output data.

The foregoing routine that processes the payload of the data segment in order to generate the first output data may take many forms. For example, the acts of the process routine may include: extracting data from the payload of the data segment; formatting the extracted data; outputting tie formatted data; and adding a number of coefficient components to a block position.

Another example of the process routine includes the acts of: extracting data from the payload of the data segment; formatting the extracted data; outputting the formatted data; and adding a number of coefficient components to a block position.

Still another example of the process routine includes the acts of: extracting two components of data from the payload of the data segment; injecting a constant adjacent to the components; injecting a number of zeros between the components of the data from the payload; and adding the components of the data from the payload, the constant, and the zeros to a block position. In the various alternate embodiments, the constant may be injected in front of, between, or to the rear of the remaining components.

Still yet another example of the process routine includes the acts of: extracting a pointer from the data segment; looking up an n-byte output; emitting the n-byte output; and adding the n-byte output to a block position.

Associated therewith is another example of the process routine that includes the acts of: retrieving a coefficient component of the compressed input data; converting the coefficient component of the compressed input data into a signed integer; injecting zeros; emitting the coefficient component of the compressed input data; and adding the coefficient component of the compressed input data to a block position.

A final example of the process routine includes the acts of: extracting an auxiliary pointer from the payload of the data segment that corresponds to one of a plurality of auxiliary data segments in an auxiliary look-up table; obtaining n bits; performing a look-up table jump.

As mentioned earlier, if during AC decoding it is determined that there is insufficient space for the first output data, an alternate second decoding operation is executed in order to generate second output data. Such second decoding operation includes multiple acts starting with performing a look-up in a look-up table based on the obtained compressed input data. The look-up table includes a plurality of data segments each having the second output data therein. If the look-up is unsuccessful, at least one bit of the compressed input data is zeroed-out and another look-up is performed. The second output data is then retrieved directly from one of the data segments that corresponds to the obtained compressed input data.

After either the first or second output data is outputted, the method continues by performing an inverse zigzag operation on the output data; merging an alternate buffer with a zigzag buffer; performing an inverse quantization operation on the output data; performing an inverse DCT operation on the output data; and emitting the output data.

In another embodiment of the present invention, upon the extraction of coefficient components of compressed input data, zeros are not immediately injected as set forth in the foregoing examples of process routines which generate the first output data. Instead, the zeros are handled after inverse quantization and DCT processing operations are performed. To accomplish this, information relative to the zeros is embedded in the process routine so that zeros may be inserted after the inverse quantization and DCT processing operations. The present embodiment thus represents another mode of operation which can be characterized as a serialized DCT process.

In still another embodiment, an additional procedure is performed upon obtaining each set of bits, or components of the input bit stream, in order to effect more efficient processing. In particular, such procedure entails effectively inputting the components of the input bit stream into a hardware processor in order to process the sets of bits in a manner that best exploits the architecture of the hardware processor. The method begins by extracting a plurality of components from the input bit stream. Next, the components of the input bit stream are analyzed. Based on such analysis, the components of the input bit stream are directed into one of a plurality of pipelines of the hardware processor for processing purposes. In one aspect of the present invention, the components of the input bit stream may be directed into one of the pipelines based on which pipeline is more suitable for processing the components, as indicated by the analysis.

These and other advantages of the present invention will become apparent to those skilled in the art upon a reading of the following descriptions of the invention and a study of the several figures of the drawing.

BRIEF DESCRIPTION OF THE DRAWINGS

The foregoing aspects are better understood from the following detailed description of one embodiment of the invention with reference to the drawings, in which.

DETAILED DESCRIPTION OF THE PREFERRED EMBODIMENTS

Figure 1:
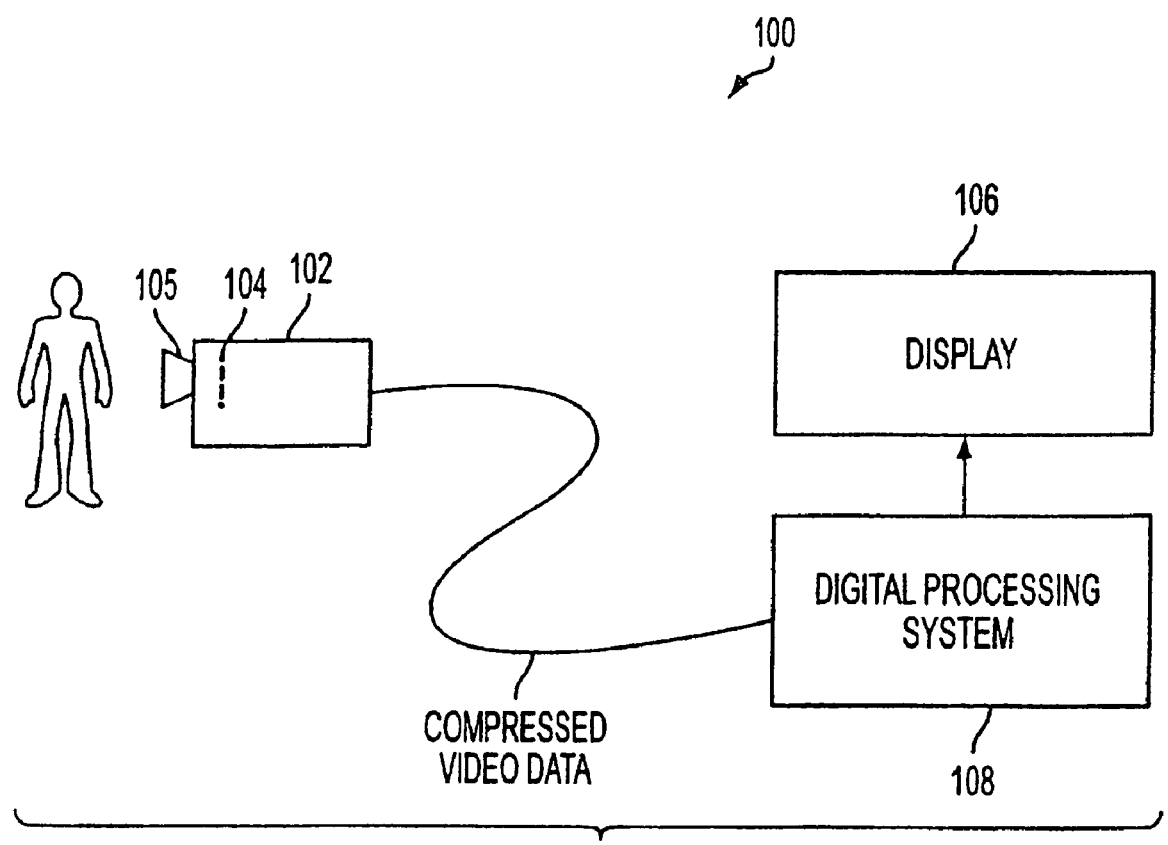
FIG. 1 is a schematic diagram including a prior art system for retrieving and displaying video signals.
Figure 2:
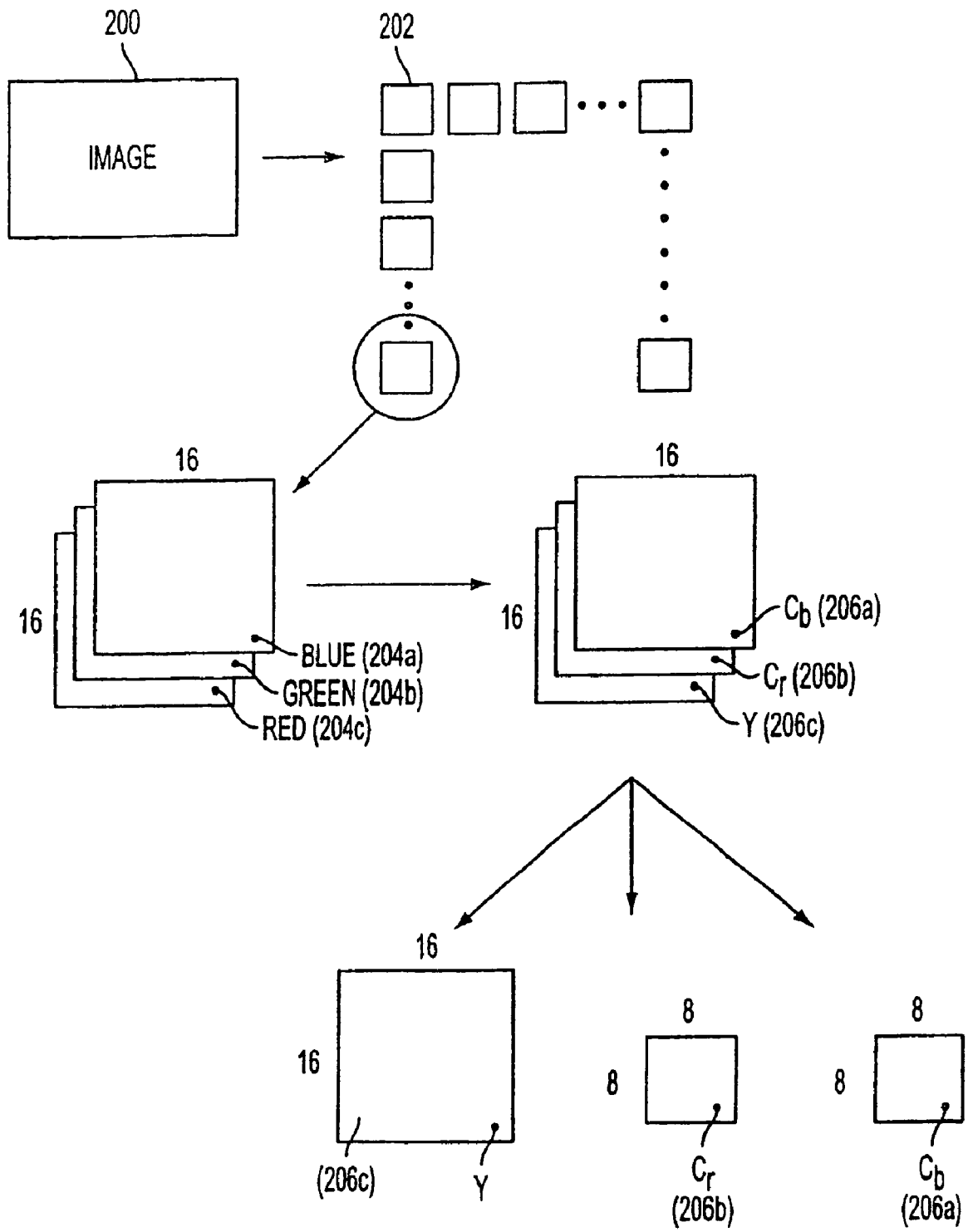
FIG. 2 is an illustration of a prior art method for partitioning an image and converting the RGB components thereof into Y, Cr, and Cb components.
Figure 3:
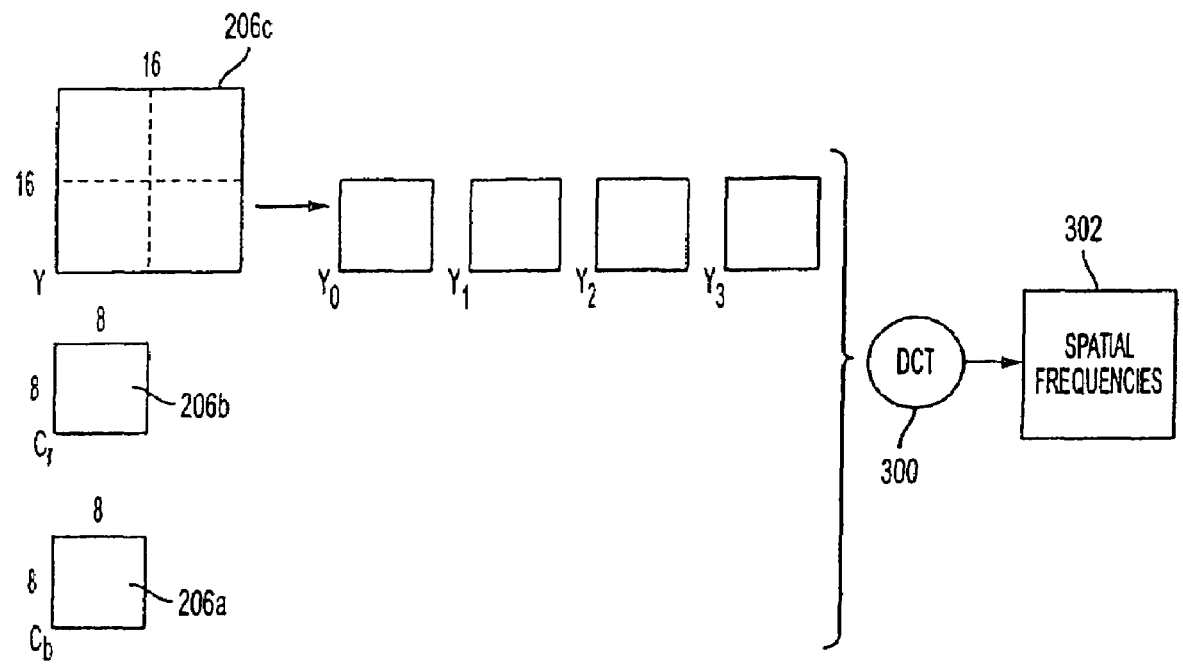
FIG. 3 is an illustration of a prior art method for partitioning the Y component of FIG. 2 and further converting the various components of the image to the frequency domain via a conventional discrete cosine transform (DCT) operation.
Figure 4:
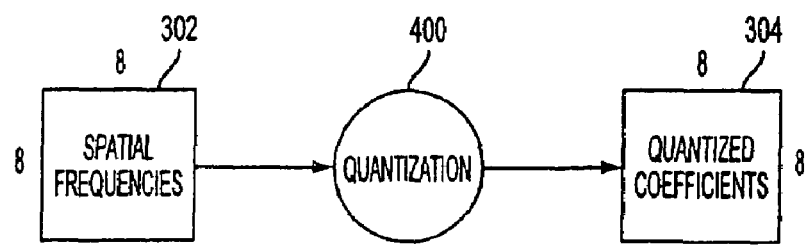
FIG. 4 is an illustration of a prior art method for converting the spatial frequencies of FIG. 3 into quantized coefficients via a conventional quantizer operation.
Figure 5:
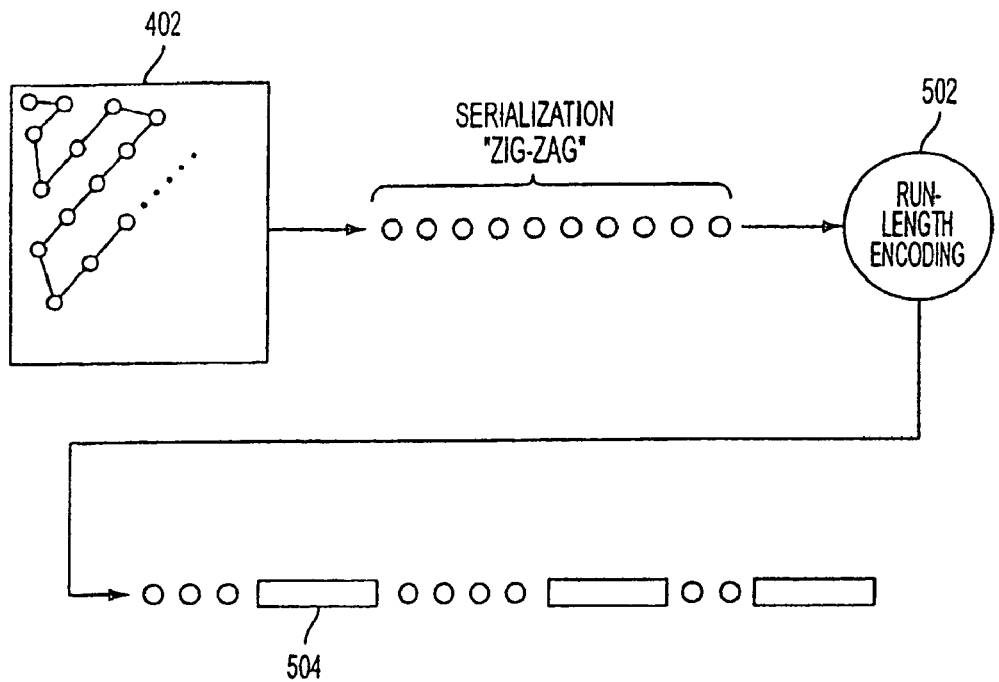
FIG. 5 is an illustration of a prior art method for performing a serialization zigzag operation on the quantized coefficients of FIG. 4 and subsequently performing a run length encoding operation.
Figure 6:
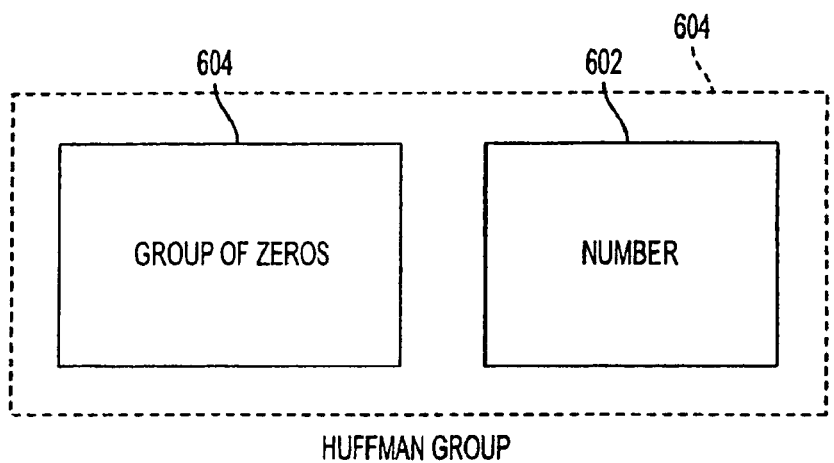
FIG. 6 is an illustration of the resulting data after the steps of FIGS. 2-5 have been performed.
Figure 7:
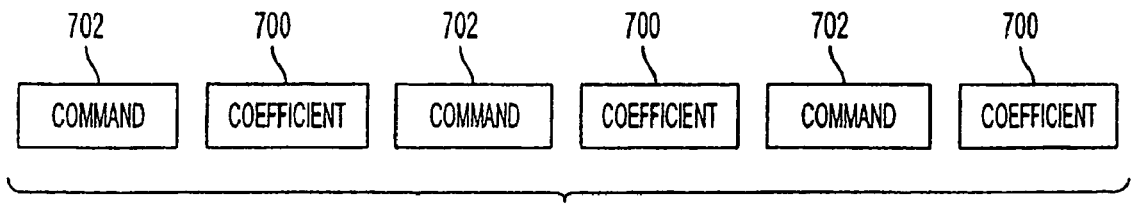
FIG. 7 is an illustration of the resulting data after the steps of FIGS. 2-5 have been performed.
Figures 8, 8A:
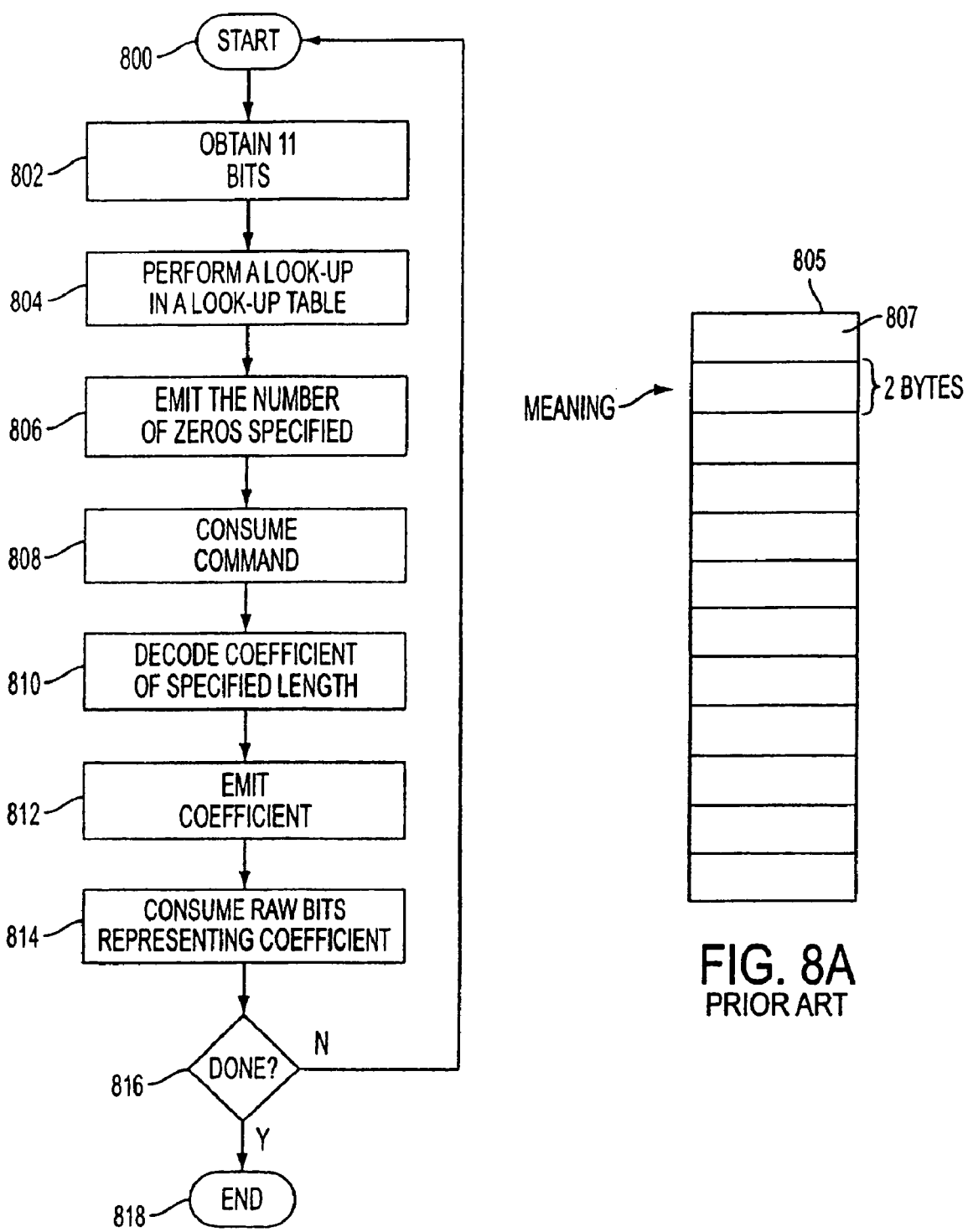
FIG. 8 is an illustration of a prior art method of decoding the data received in the form shown in FIG. 7.
FIG. 8a is an illustration of a prior art look-up table employed during the decoding of data by the process shown in FIG. 8.

FIGS. 1-7 illustrate a coding scheme of the prior art. FIGS. 8 and 8a illustrate a decoding process of the prior art. With reference now to FIGS. 9-24, it shown that the present invention includes a system, method, and article of manufacture for decompressing a bit stream of compressed data representing a plurality of image blocks, or portions.

Figure 9:
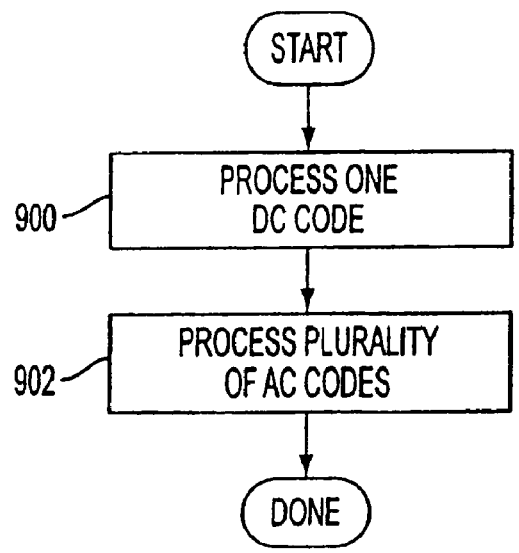
FIG. 9 is a flowchart illustrating a procedure for decoding the data received in the form shown in FIG. 7 in accordance with one embodiment of the present invention.

As shown in FIG. 9, this includes a two-step method of processing both a DC code in operation 900 and a plurality of AC codes in operation 902. As is well known by those of ordinary skill in the art, the DC code relates to a single initial set of the bits representative of an image block while the AC codes relate to a plurality of subsequent sets of the bits representing the image block. This method is preferably a computer implemented process executed by a computer system as shown in FIG. 9a.

Figure 9A:
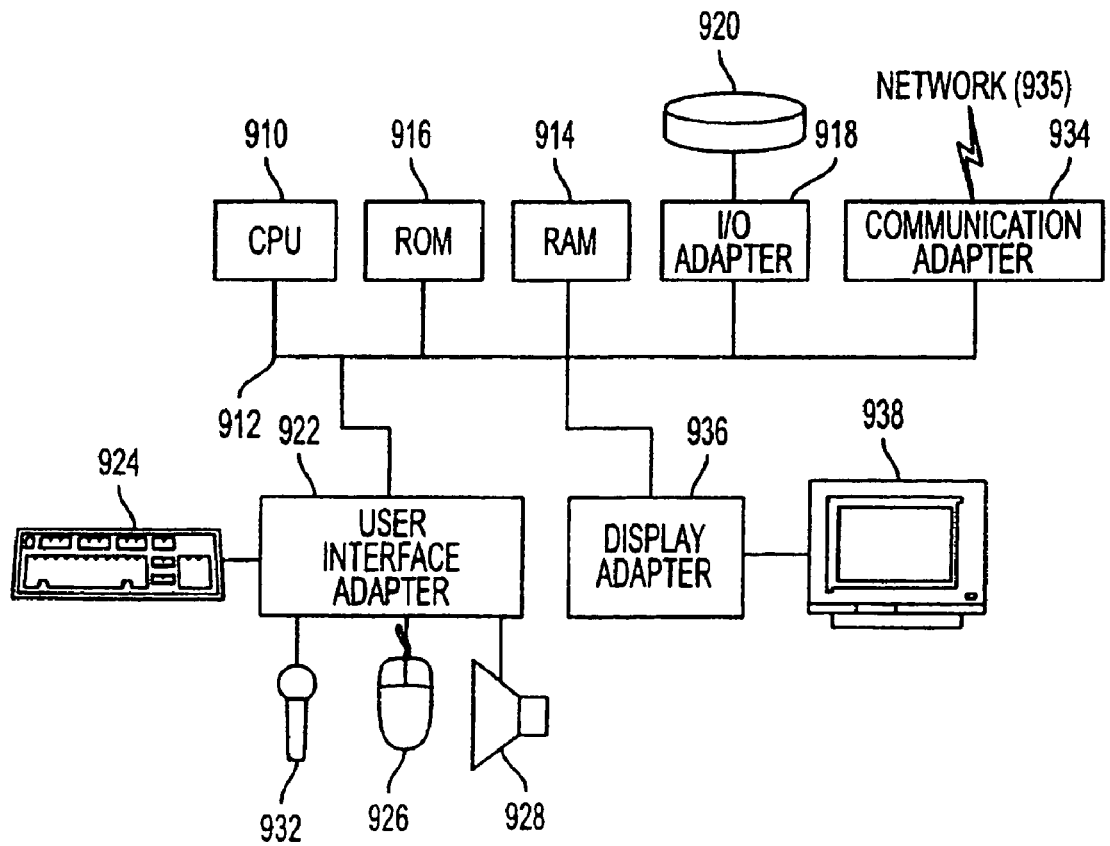
FIG. 9a is a schematic depicting an exemplary hardware embodiment of the present invention.

FIG. 9a illustrates an exemplary hardware configuration in accordance with one embodiment having a central processing unit 910, such as a microprocessor, and a number of other units interconnected via a system bus 912. The hardware configuration shown in FIG. 9a includes Random Access Memory (RAM) 914, Read Only Memory (ROM) 916, an I/O adapter 918 for connecting peripheral devices such as disk storage units 920 to the bus 912, a user interface adapter 922 for connecting a keyboard 924, a mouse 926, a speaker 928, a microphone 932, and/or other user interface devices such as a touch screen (not shown) to the bus 912, communication adapter 934 for connecting the hardware configuration to a communication network 935 (e.g., a data processing network) and a display adapter 936 for connecting the bus 912 to a display device 938.

The hardware configuration typically has resident thereon an operating system such as the Microsoft Windows NT or Windows/98/2000 Operating System (OS), the IBM OS/2 operating system, the MAC OS, or UNIX operating system. Those skilled in the art will appreciate that the present invention may also be implemented on platforms and operating systems other than those mentioned.

Figure 10:
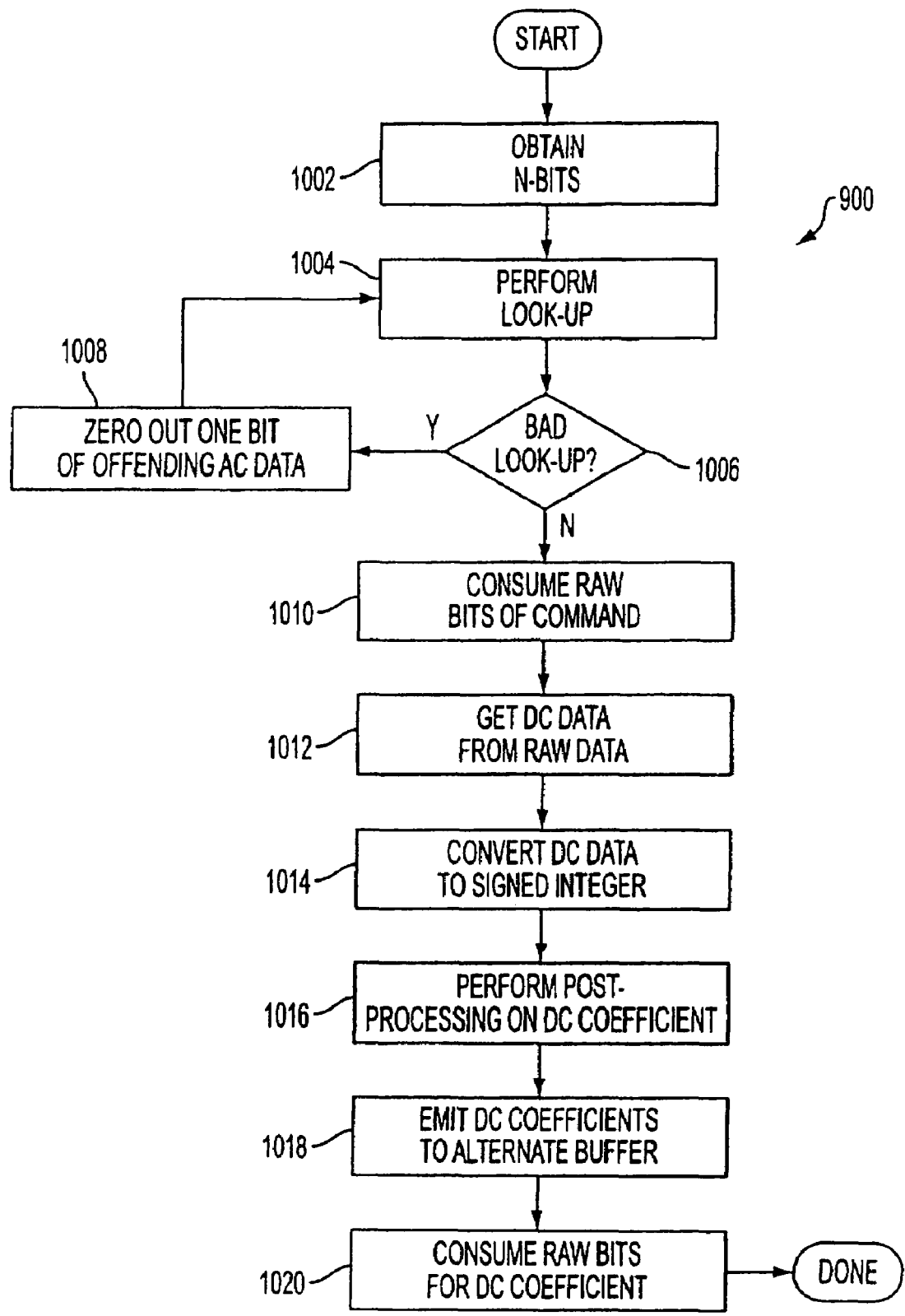
FIG. 10 is a more detailed flowchart showing the processing of the DC code shown in FIG. 9 in accordance with one embodiment of the present invention.

FIG. 10 shows in greater detail the method of processing the DC code of operation 900 of FIG. 9. First, a predetermined number of bits of compressed input data relating to the DC code are first obtained from the bit stream in operation 1002. Thereafter, in operation 1004, a look-up is performed in a look-up table based on the obtained compressed input data. It should be noted that the present look-up table may be similar to the look-up table in operation 804 of Prior Art FIG. 8. In other words, the look-up table includes a plurality of data segments each having output data therein.

If the look-up of operation 1004 is determined to be unsuccessful in decision 1006, at least one bit of the compressed input data is zeroed out after which another look-up is performed in operation 1008. An unsuccessful look-up often occurs as a result of a portion of the AC codes being inadvertently obtained. Next, a command component of the compressed input data is consumed, or deleted, in operation 1010. DC data is then retrieved from the compressed input data in operation 1012 after which such DC data is converted to a signed integer in operation 1014. Then, in operation 1016, a DC coefficient component of the compressed input data is processed after which it is emitted to an alternate buffer in order to accommodate a large size thereof. Note operation 1018. Finally, the compressed input data corresponding to the DC coefficient component of the compressed input data is consumed. Note operation 1020.

Figure 11:
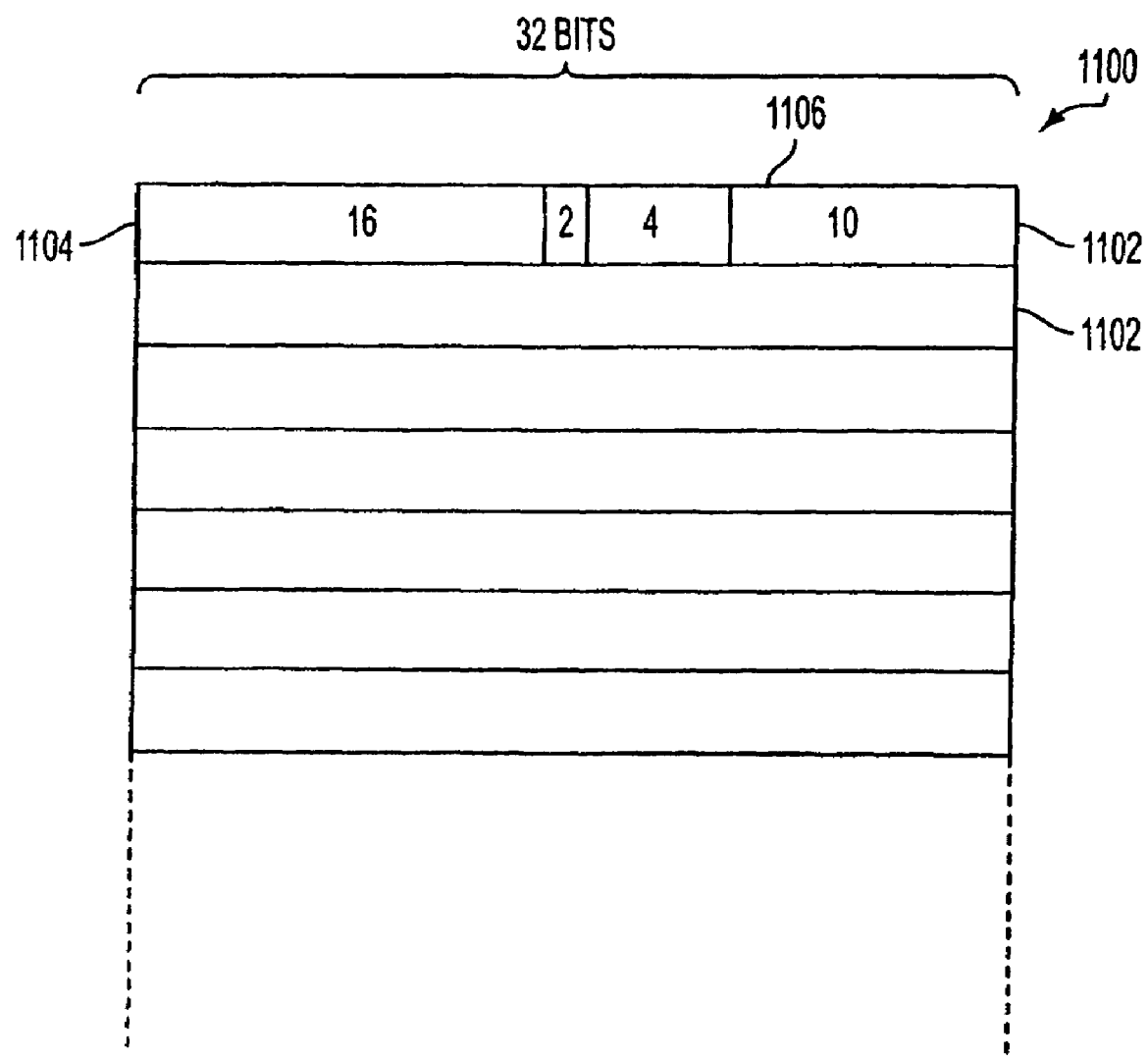
FIG. 11 is an illustration of a look-up table employed during the decoding of data by the process shown in FIG. 9 in accordance with one embodiment of the present invention.

During DC code processing, the look-up may be performed on a prior art look-up table similar to that discussed earlier. In order to carry out AC code processing, however, a specific data structure is employed during use. An example of such data structure 100 is shown in FIG. 11. The data structure includes a plurality of data segments 1102 each having a payload 1104 and a pointer 1106 which, together, amount to 32 bits. The payload 1104 includes 16 bits in one of a plurality of coding schemes. In one embodiment, at least 14 types of code schemes are available. Further, the pointer 1106 includes 10 bits that correspond to a routine stored in memory which is capable of processing the coding scheme of the payload 1104 associated with the pointer 1106. In addition, the data segments 1102 may each further include 4 bits representing a number, i.e. 1-16, of the obtained bits of compressed input data that is understood. Finally, 2 bits are left unused.

Figure 12:
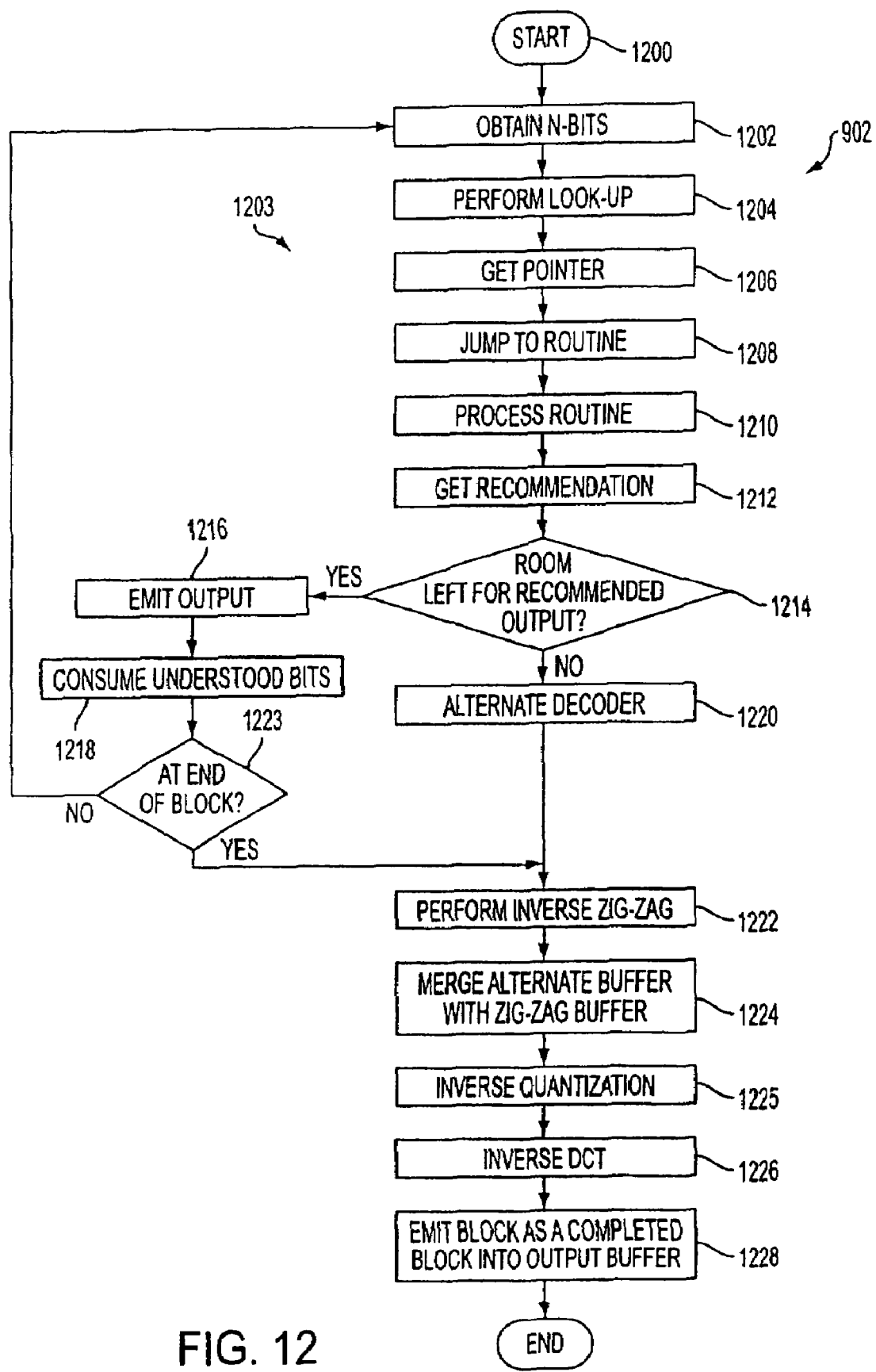
FIG. 12 is a more detailed flowchart showing the processing of the AC codes shown in FIG. 9 in accordance with one embodiment of the present invention.

With reference now to FIG. 12, the process associated with decompressing the AC codes is shown to begin in operation 1200. First, a plurality of bits of compressed input data relating to the AC codes are first retrieved from the bit stream in operation 1202. It should be noted that any number of bits may be retrieved that is capable of being handled by the foregoing data structure. A first decoding operation 1203 is then executed based on the obtained compressed input data in order to generate first output data.

The first decoding operation 1203 first includes performing a look-up in the look-up table based on the obtained compressed input data in operation 1202. Note operation 1204. Such look-up may performed in a look-up table "jump" which in turn accesses the look-up table of FIG. 11, or may be performed directly to the look-up table. In operation 1206, the pointer is then retrieved from one of the data segments that corresponds to the obtained compressed input data after which a jump is executed in operation 1208. Next, the process routine corresponding to the retrieved pointer is executed in operation 1210. The payload is then processed in the executed routine in order to generate the first output data, as indicated in operation 1212. The manner in which the process routine processes the payload will be set forth hereinafter in greater detail.

With continuing reference FIG. 12, it is shown that a recommendation is received as a result of calling the process routine that processes the payload. Such recommendation comprises the first output data which may take the form of a fully decoded output and a number of coefficients or any other desired form. It is then determined in decision 1214 whether sufficient space is available for the number of coefficients of the first output data. In other words, it is determined whether there is room for the image block corresponding to the raw data. This determination is executed by locating an end of the image block.

If it is determined that there is sufficient space for the coefficients of the first output data in decision 1214, the recommendation is accepted and the first output data is outputted in operation 1216. Thereafter, the understood bits of the raw data are consumed, or deleted, in operation 1218, After the first output data is outputted, it is determined in decision 1223 whether the decoding operation is currently retrieving compressed input data that are representative of an end of an image block. If not, the first decoding operation 1203 is repeated, as shown in FIG. 12.

If it is determined that there is insufficient space for the first output data in decision 1214, an alternate second decoding operation 1220 is executed in order to generate second output data. More detail will be provided relating to the alternate second decoding operation 1220 in reference to FIG. 13.

Once it is determined in decision 1223 that the decoding operation is at the end of an image block or the alternate second decoding operation 1220 has been executed, an inverse zigzag operation is performed on the output data in operation 1222. Next, an alternate buffer is merged with a zigzag buffer in operation 1224. Thereafter, in operation 1225, an inverse quantization operation is performed on the output data. Further, an inverse DCT operation is performed on the output data in operation 1226 after which the output data is emitted in operation 1228, thereby concluding the decompression. Additional detail regarding the foregoing operations will be set forth hereinafter in greater detail.

Figure 13:
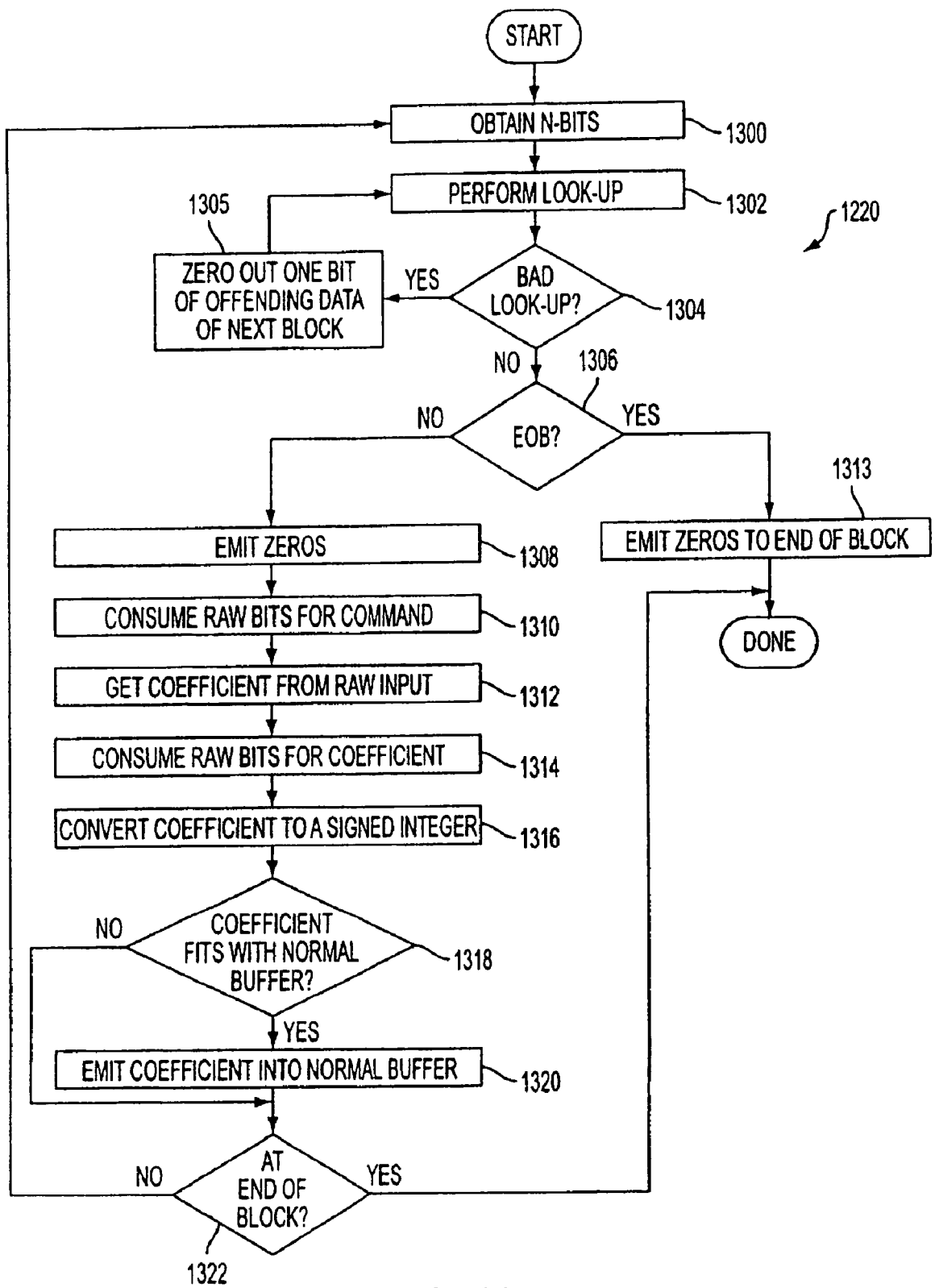
FIG. 13 is a more detailed flowchart showing the steps associated with the alternate decoder operation shown in FIG. 12 in accordance with one with one embodiment of the present invention.

As mentioned earlier, if during AC decoding it is determined that there is insufficient space for the first output data, an alternate second decoding operation 1220 is executed in order to generate second output data. FIG. 13 is a more detailed illustration of the method associated with the alternate decoder operation 1220 of FIG. 12.

As shown in FIG. 13, the alternate second decoding operation 1220 includes multiple steps starting with obtaining n bits from the input data in operation 1300. The exact number of bits may vary depending on a particular Huffman decoding scheme being used. For example, 14 bits are obtained in operation in one embodiment of the present invention. Thereafter, a look-up is performed in a look-up table based on the obtained compressed input data. Note operation 1302. It should be noted that the look-up table includes a plurality of data segments each having the second output data therein.

If the look-up is determined to be unsuccessful in decision 1304, at least one bit of the compressed input data is zeroed-out, or deleted, in operation 1305 and another look-up is performed. In the present description, a bad look-up is defined as the situation wherein the input data has no corresponding output data in the look-up table, the input data corresponds with a meaningless data segment in the look-up table, or any other situation where undesired results occur. To this end, corrupt or useless data is erased in the search for meaningful, useful data which has a corresponding data segment in the look-up table. Once a successful look-up occurs in decision 1304, the second output data is then retrieved directly from one of the data segments in the look-up table that corresponds to the currently possessed input data. It is then determined in decision 1306 whether a current position of the input data corresponds with an end of a block of an image.

Upon it being determined that the compressed input data is at the end of a block in decision 1306, the method further includes emitting zeros to the end of the block in operation 1313. If, however, it is determined that the compressed input data is not at the end of a block in decision 1306, the method further includes multiple operations that are executed given information from the second output data.

As shown in FIG. 13, such steps include operation 1308 wherein the zeros are emitted as specified by the second output data. A command component of the compressed input data is then consumed in operation 1310 after which a coefficient component of the compressed input data is retrieved in operation 1312. Next, the coefficient component of the compressed input data is consumed. Note operation 1314. The coefficient component of the compressed input data is then converted to a signed integer. Note operation 1316.

If the coefficient component is of an appropriate size to fit in the normal buffer as determined in decision 1318, the coefficient component of the compressed input data is emitted in operation 1320. It is then determined again in decision 1322 whether a current position is at an end of a block of an image. If not, the present invention obtains another n bits in operation 1300 and the method is repeated.

FIGS. 14-18 illustrate more detailed flowcharts showing various permutations associated with the process routine of operation 1210 shown in FIG. 12. Such routine processes the payload of the data segment of FIG. 11 in accordance with various methods in order to generate the first output data. Examples of such various methods will now be set forth.

Figure 14:
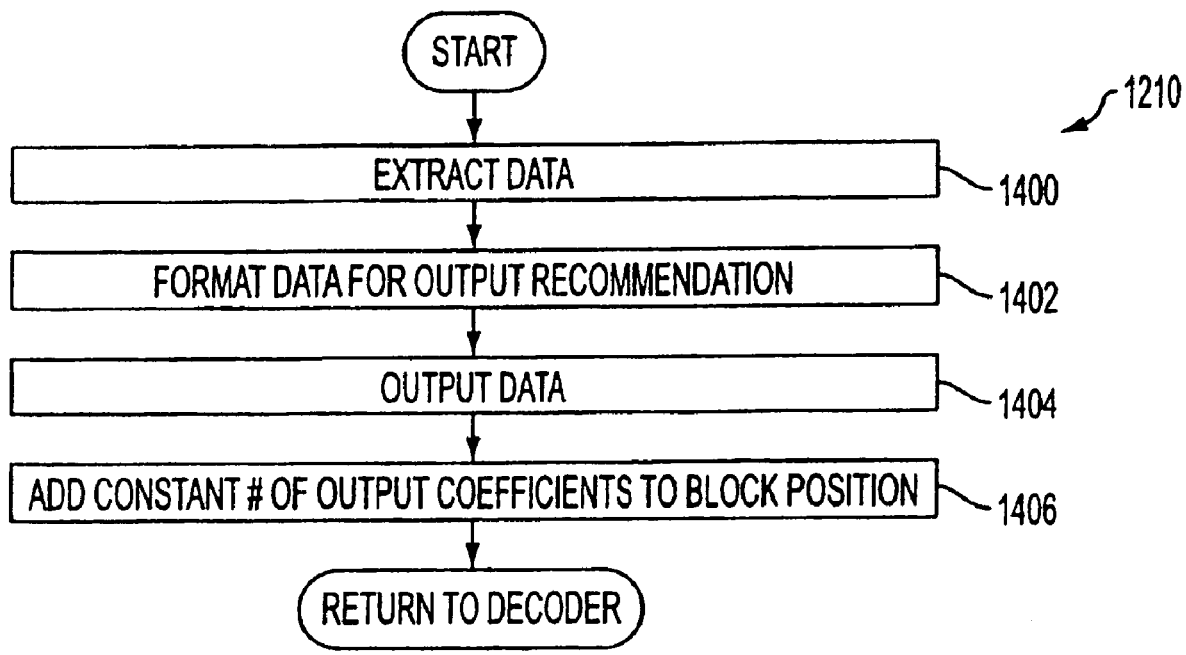
FIG. 14 is a more detailed flowchart showing the steps associated with the process routine operation shown in FIG. 12 in accordance with one of many embodiments of the process routine of the present invention.

FIG. 14 illustrates a fundamental example of the process routine 1210 shown in FIG. 12. As shown, such routine may include: extracting data from the payload of the data segment in operation 1400; formatting the extracted data in operation 1402; outputting the formatted data in operation 1404; and adding a number of coefficient components to a block position in operation 1406.

Figure 15:
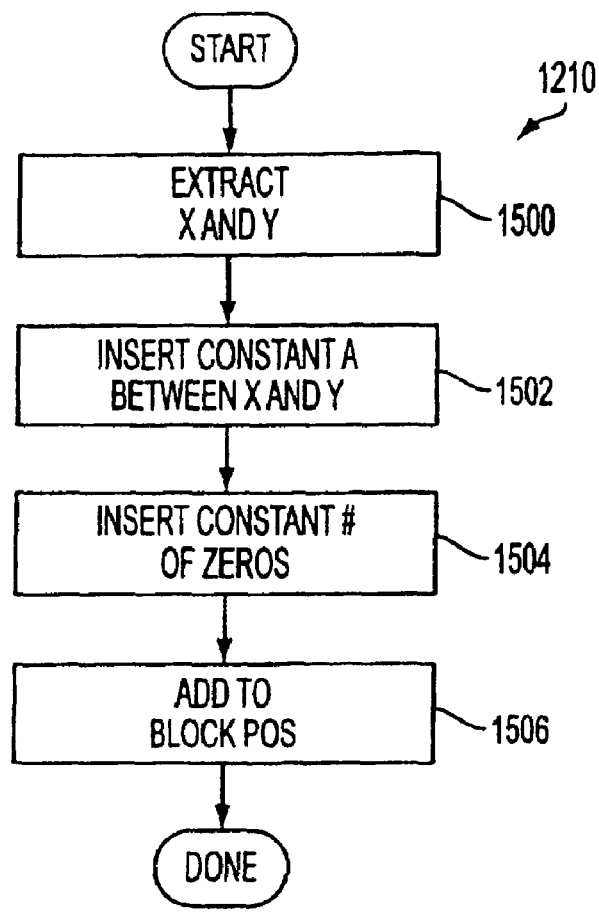
FIG. 15 is a more detailed flowchart showing the steps associated with the process routine operation shown in FIG. 12 in accordance with one of many embodiments of the process routine of the present invention.
Figure 15A:
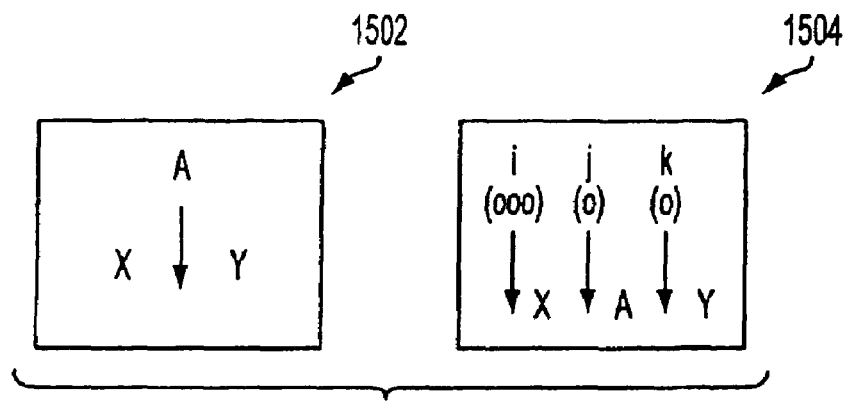
FIG. 15a is an illustration showing the injection of zeros and a constant between the X and Y components during the process routine shown in FIG. 15.

FIG. 15 illustrates another example of the process routine of operation 1210 shown in FIG. 12. Such process routine first includes the act of extracting two components of data from the payload of the data segment in operation 1500. In particular, the process routine of FIG. 15 extracts two fully decoded 8-bit constants X, Y embedded in the payload of the data segment. Such constants are eventually intended to take the form of output coefficients. Next, a constant A is injected adjacent to the components in operation 1502. Note FIG. 15a. The constant A is smaller than the constants X, Y and initially resides in the pointer of the data structure of FIG. 11. As such, the constant A is inherent in the pointer which in turn resides in the bit stream. Further, the constant A takes little space prior to decoding. It should be noted that for every possible combination of constant A and the remaining constants X, Y, there is a separate corresponding data segment in the look-up table.

With reference now to operation 1504 of FIG. 15, a number of zeros are injected between the constants X, Y of the data from the payload. Similar to the constant A, the zeros are part of the identity of the process routine. Next, in operation 1506, the components of the data from the payload, the pointer, and the zeros are added to a block position. In the various alternate embodiments, the constant A may be injected in front or to the rear of the remaining components. In still other embodiments, the constants A and/or Y may be excluded.

Figure 16:
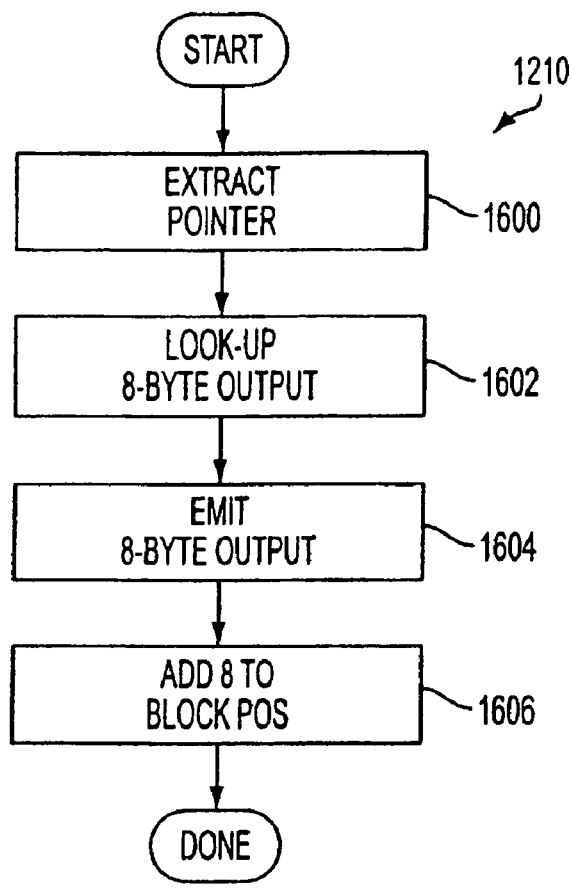
FIG. 16 is a more detailed flowchart showing the steps associated with the process routine operation shown in FIG. 12 in accordance with one of many embodiments of the process routine of the present invention.
Figure 16A:
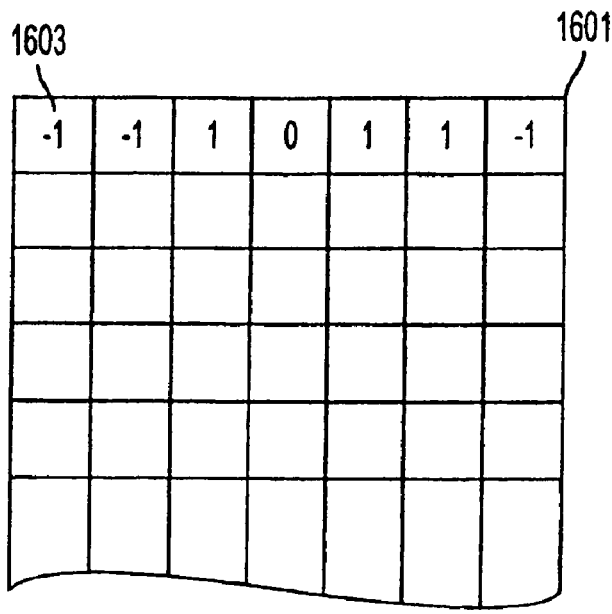
FIG. 16a is an additional table of the present invention.

FIG. 16 illustrates yet another embodiment of the process routine 1210 of FIG. 12, wherein a pointer is first extracted from the data segment in operation 1600. It should be noted that the present pointer is not that which accesses the data segment, but rather an additional pointer situated in the payload. Such additional pointer is then used to access a data segment in an additional table 1601 like that shown in FIG. 16a. The additional table 1601 of FIG. 16a is 8-bytes wide with eight entries 1603. Use of the additional table is limited to numbers which are capable of fitting within one of the eight entries. In alternate embodiments, the table may be configured in any size of n-bytes.

With continuing reference to FIG. 16, an 8-byte output is looked up in the additional table and thereafter emitted to the regular buffer in operation 1602 and 1604, respectively. Thereafter, the 8-byte output is added to a block position in operation 1606.

Figure 17:
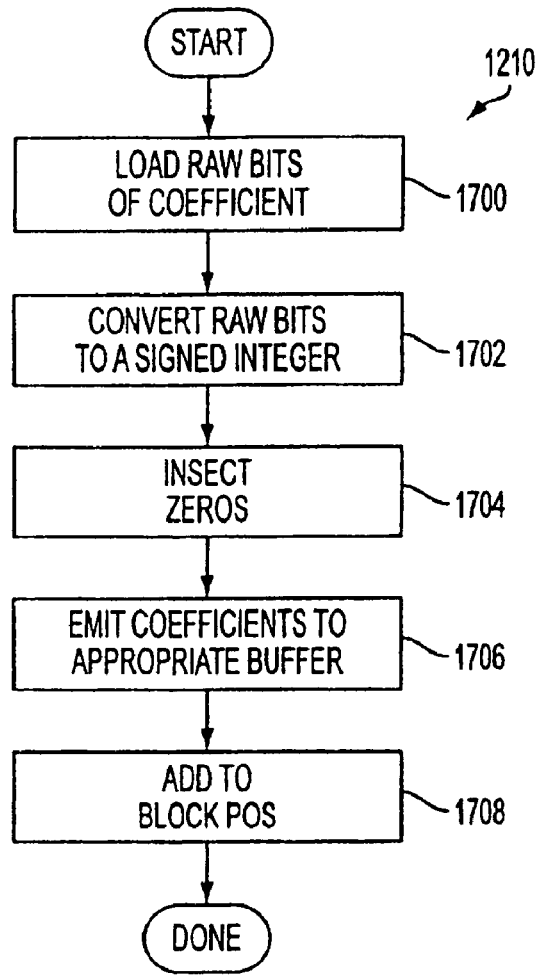
FIG. 17 is a more detailed flowchart showing the steps associated with the process routine operation shown in FIG. 12 in accordance with one of many embodiments of the process routine of the present invention.

Still yet another example of the process routine of operation 1210 of FIG. 12 is shown in FIG. 17. The current example does not employ the payload of the corresponding data segments of the data structure of FIG. 11. Further, the present process routine may be especially useful when a number of bits representative of a command is large enough to preclude the retrieval of the bits associated with the coefficient.

When executed, the process routine of FIG. 17 first includes the act of retrieving a coefficient component of the compressed input data in the form of raw bits. Note operation 1700. It should be noted that a number of raw bits to be retrieved is inherent in the process routine. Next, the coefficient component of the compressed input data is converted to into a signed integer in operation 1702. Zeros are then injected in operation 1704. In one embodiment, this may be accomplished by simply advancing an output pointer in a field of existing zeros inherent in the process routine. The coefficient component of the compressed input data is then emitted in operation 1706. The coefficient component of the compressed input data is added to the main buffer unless too large in which case the coefficient component is emitted to the alternate buffer. Next, in operation 1708, the coefficient component of the compressed input data is added to a block position.

Figure 18:
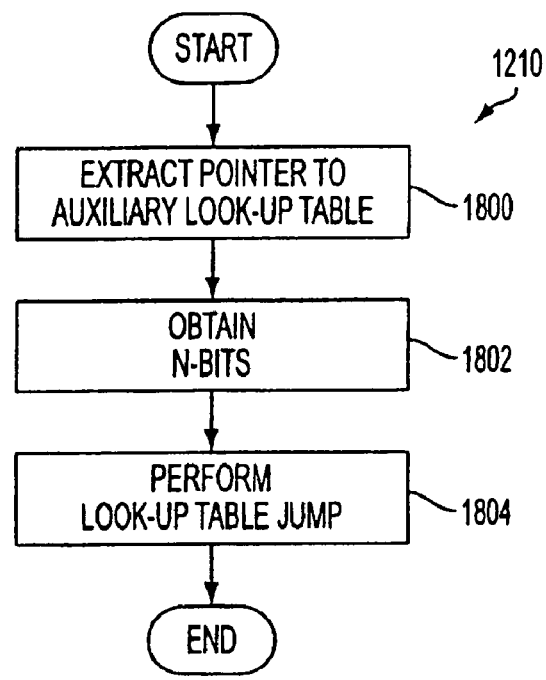
FIG. 18 is a more detailed flowchart showing the steps associated with the process routine operation shown in FIG. 12 in accordance with one of many embodiments of the process routine of the present invention.
Figure 19:
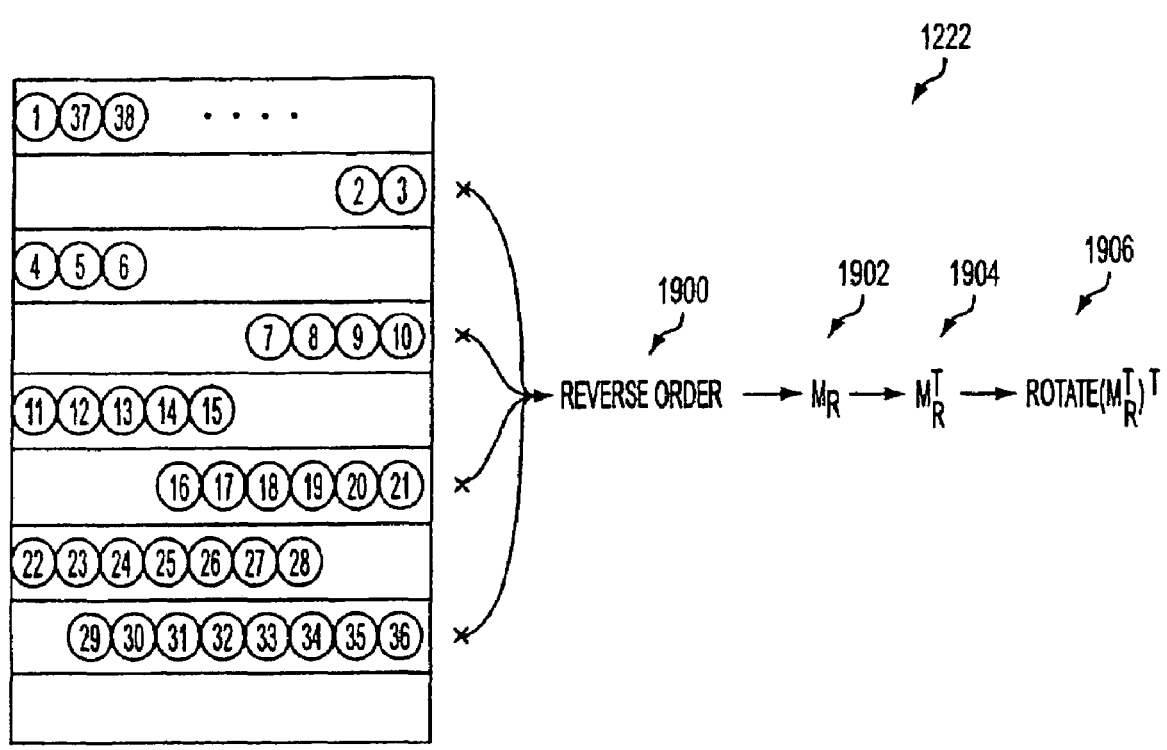
FIG. 19 is a more detailed flowchart showing the steps associated with the process routine operation shown in FIG. 12 in accordance with one of many embodiments of the process routine of the present invention.

FIG. 18 illustrates still another embodiment of the process routine of operation 1210 of FIG. 12. Namely, such process routine accommodates the situation in which an amount of bits obtained is insufficient in containing all of the necessary Huffman Coding commands. This is accomplished by a second look-up which is performed with remaining bits to be processed. The instant process routine initially includes extracting an auxiliary pointer from the payload of the data segment that corresponds to one of a plurality of auxiliary data segments in an auxiliary look-up table. Note operation 1800. Next, bits are obtained from the compressed input data in operation 1802. It should be noted that in the present embodiment, look-ups may be continuously executed until desired data is obtained. See operation 1804

As shown earlier in FIG. 12, multiple final steps are taken in order to complete decompression of the data. The inverse zigzag operation 1222 of FIG. 12 is shown in greater detail in FIG. 19. Such operation is necessary in order to reverse the order of the data, thereby negating the effects of the zigzag operation during compression in order to prepare for an inverse DCT operation. To accomplish the inverse zigzag operation, a reverse order operation 1900, a first transpose operation 1902, a rotation 1904, and a second transpose operation 1906 is carried out in a manner well known to those skilled in the art. In the alternative, the inverse zigzag operation may be modified for various microprocessors that may be currently used.

Figure 20:
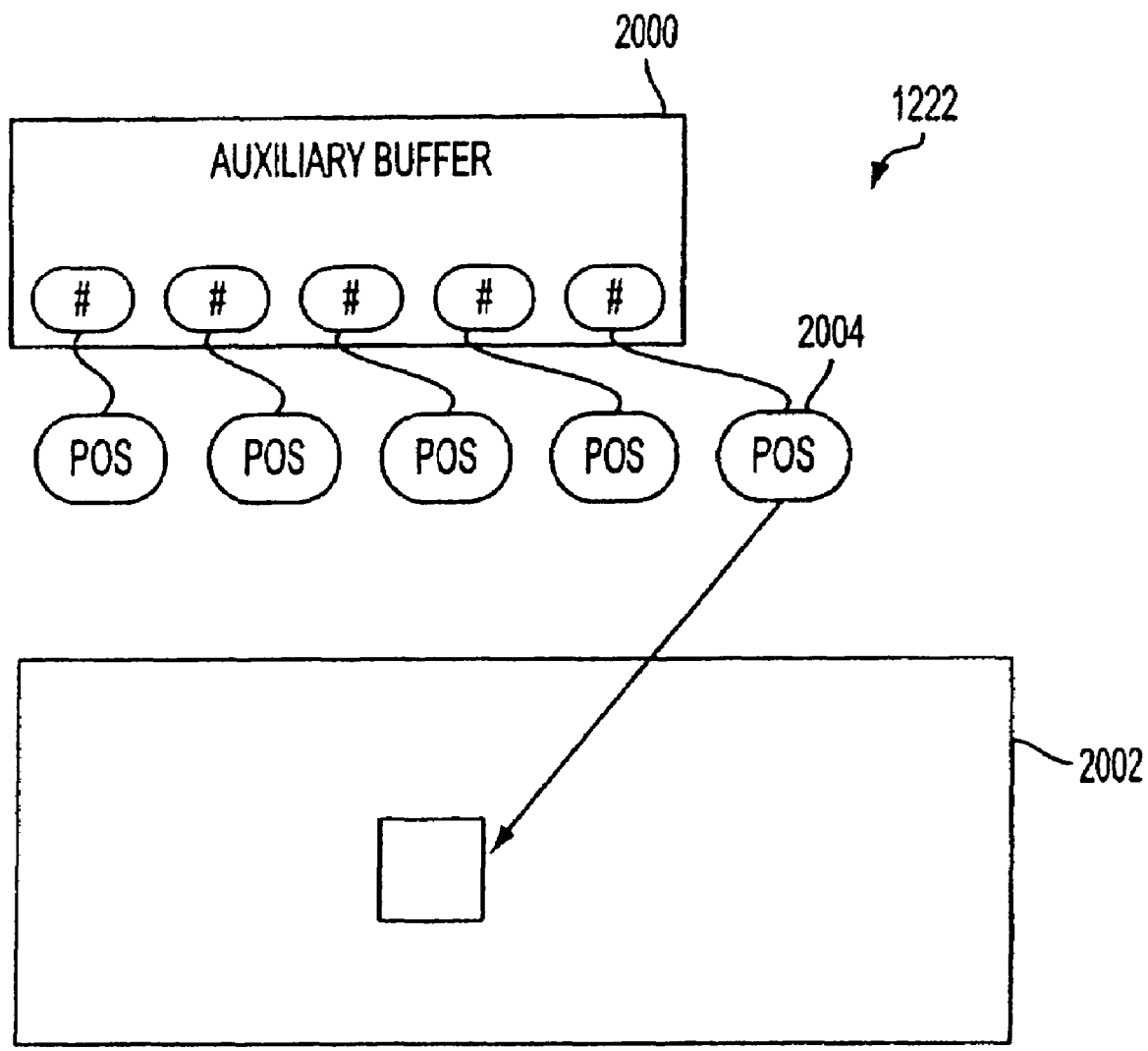
FIG. 20 is a more detailed flowchart showing the steps associated with the process routine operation shown in FIG. 12 in accordance with one of many embodiments of the process routine of the present invention.

While the inverse zigzag operation and the remaining decompression operations perform better with data of a smaller magnitude, i.e. 8/bits per sample, the data may be expanded to 16/bits per sample in order to accommodate larger requirements of certain blocks of the image. To accommodate such situation, an alternate buffer 2000 is merged with a zigzag buffer 2002, as shown in FIG. 20. By this structure, blocks of the image requiring 16/bits per sample may be accommodated and an output of 8/bits per sample may be obtained. As such, the remaining decompression operations may expediently process the data at 8/bits per sample while still accommodating periodic requirements for larger data samples of up to 16/bits per sample. It should be noted that each of the coefficients that reside in the alternate buffer include a tag or identifier 2004 to indicate a proper location or order in the inverse zigzag operation.

Figure 21:
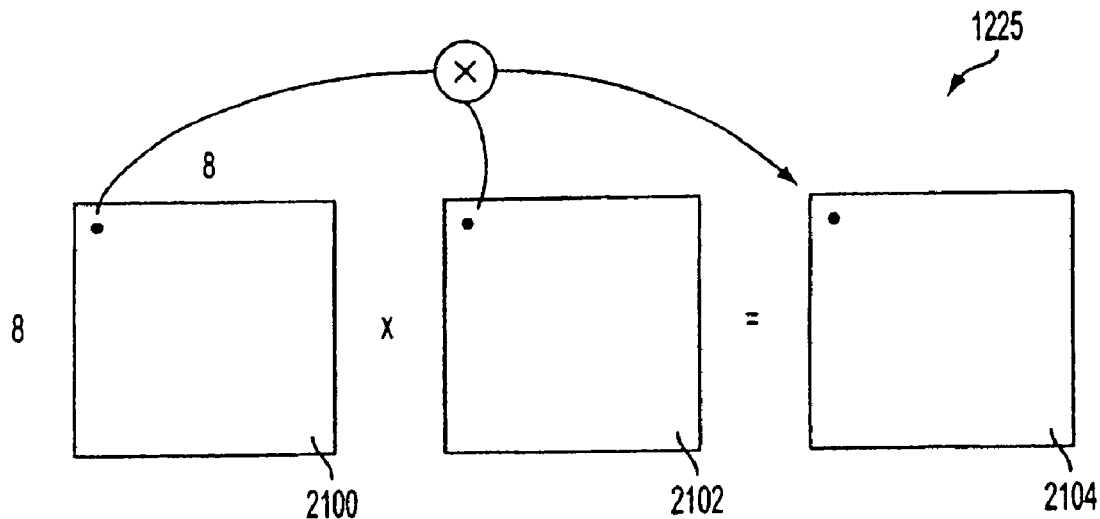
FIG. 21 is an illustration depicting an inverse quantization operation, in accordance with one embodiment of the present invention.

FIG. 21 is an illustration of operation 1225 of FIG. 12 which includes the inverse quantization operation. The specific order of such inverse quantization operation is critical since such operation performs optimally on data samples of smaller sizes like those outputted by the auxiliary buffer 2000. As shown in FIG. 21, the quantized coefficients 2100 from the auxiliary buffer 2000 are multiplied by inverse quantization coefficients 2102 thus rendering spatial frequency coefficients 2104.

Figure 22:
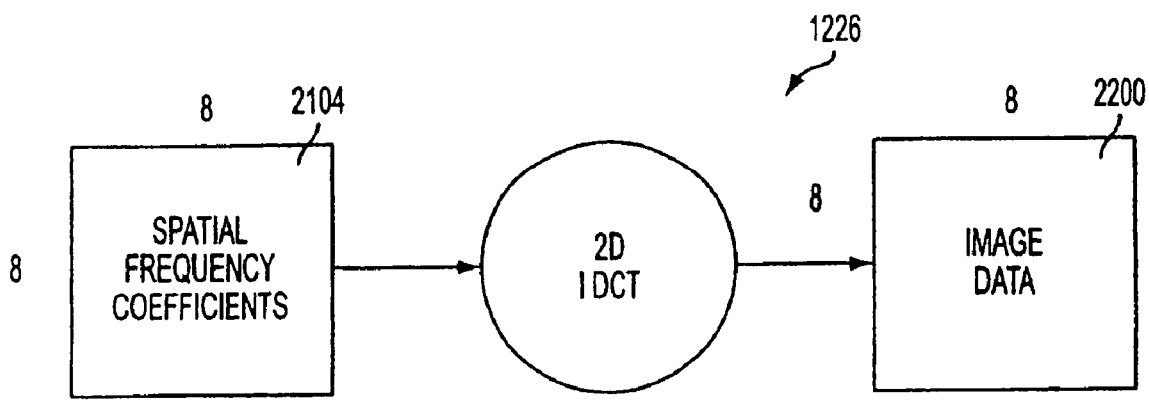
FIG. 22 is an illustration depicting an inverse DCT operation, in accordance with one embodiment of the present invention.

FIG. 22 shows in greater detail the two-dimensional (2-D) inverse DCT operation 1226 of FIG. 12. As is well known to those of ordinary skill, the 2-D DCT operation processes the spatial frequency coefficients 2104 in order to generate image data 2200. Such image data 2200 takes the form of a plurality of 8×8 data samples which each comprise a portion of a color component of an image block.

Figure 23:
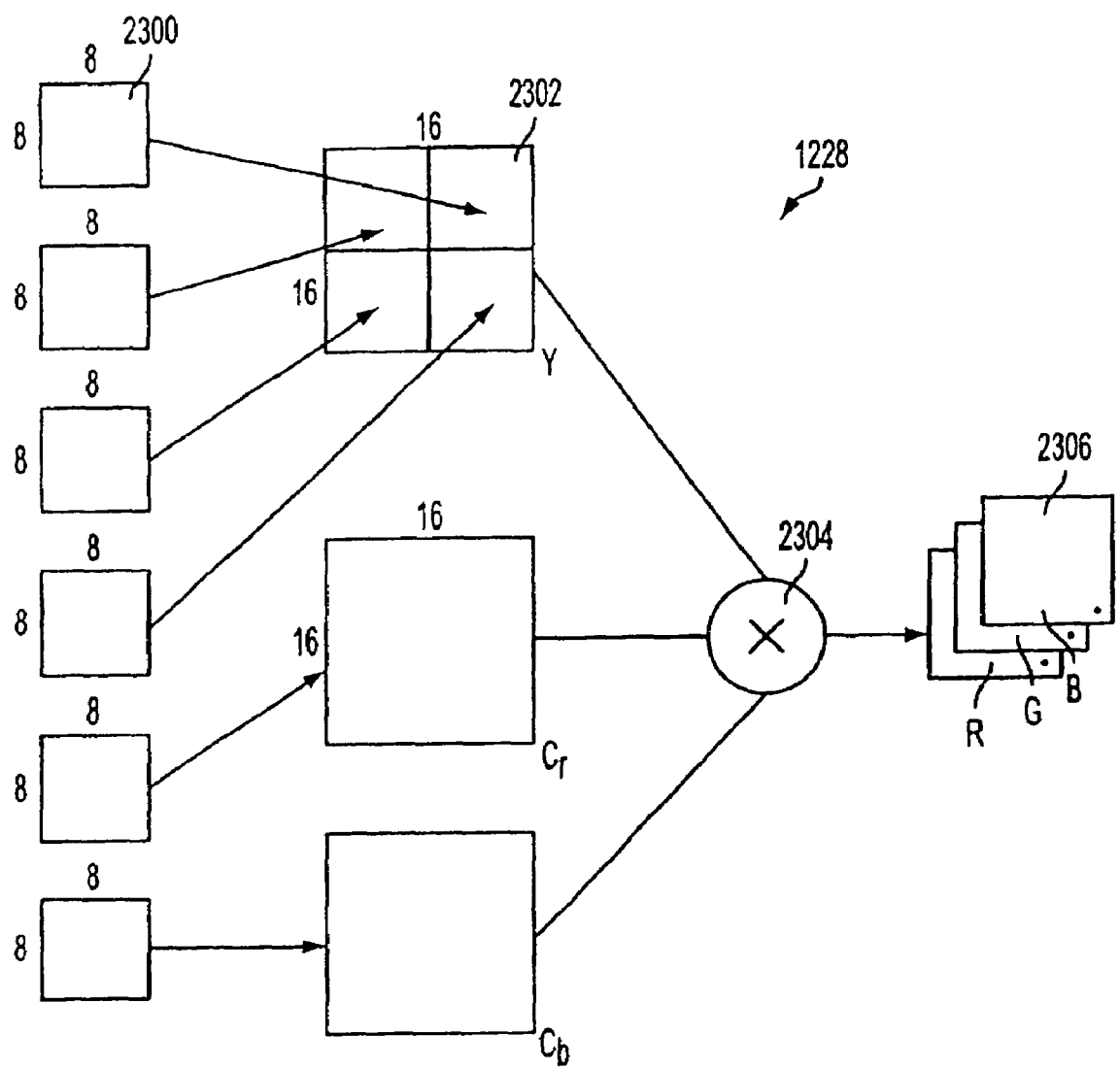
FIG. 23 is an illustration depicting a macro-block assembly operation, in accordance with one embodiment of the present invention.

FIG. 23 illustrates the block assembly operation 1228 of FIG. 12, wherein the portions of the color components 2300 of the image block are combined into 16×16 data samples 2302 which represent a complete color component of the corresponding image block. Next, a matrix multiplication operation 2304 is executed which combines the color components in order to render the complete image block 2306 that is representative of RGB values. The data samples are thus ready for conventional final processing for display, storage, transmission, or the like.

Figure 24:
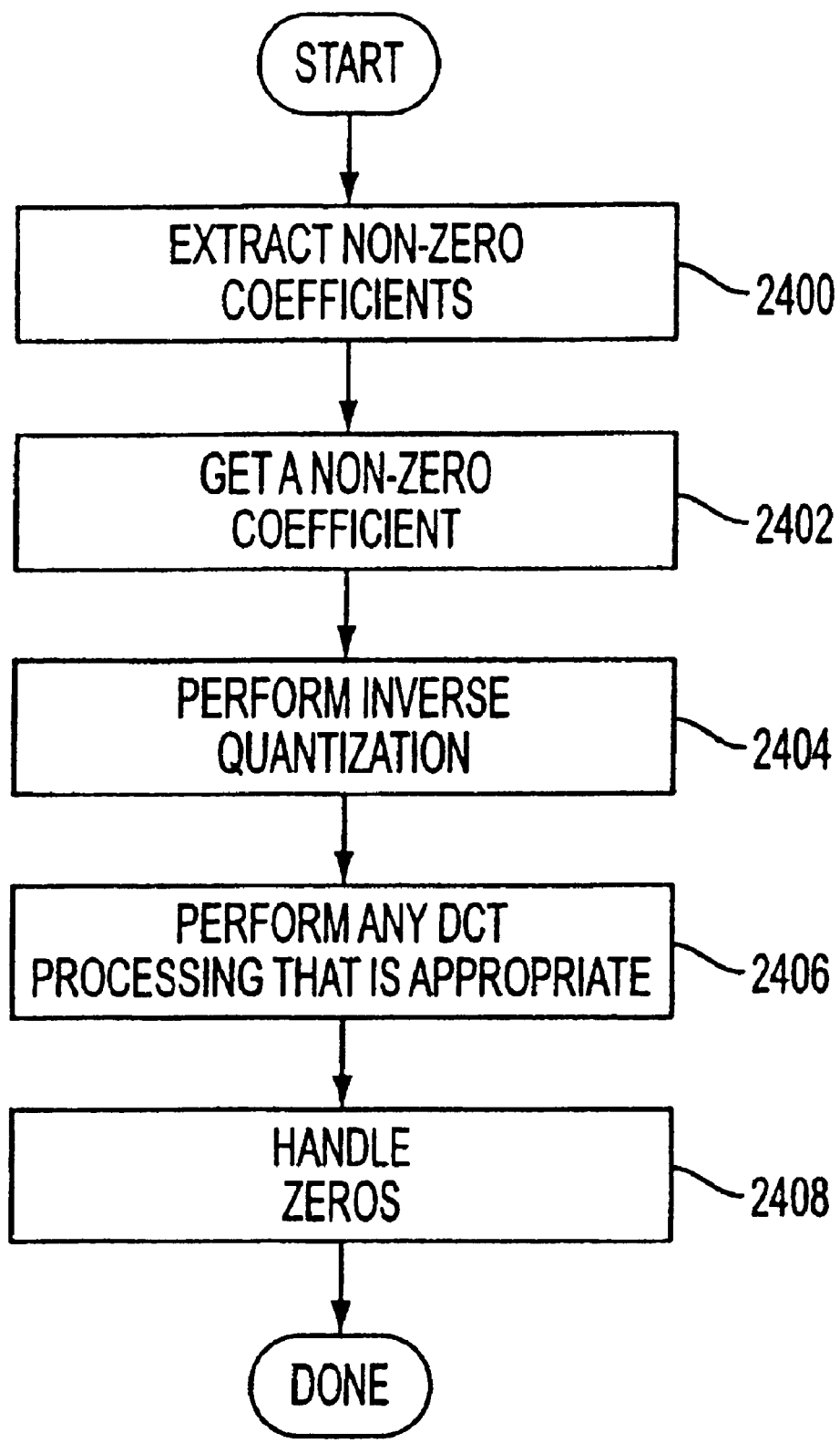
FIG. 24 is an illustration depicting an alternate mode of operation, in accordance with one embodiment of the present invention.

FIG. 24 illustrates another embodiment of the present invention the beginning of which is similar to that disclosed in FIG. 15. A major difference resides in the fact that upon the extraction of coefficient components of compressed input data, zeros are not immediately injected as set forth in the foregoing examples of process routines which generate the first output data. Instead, the zeros are handled after inverse quantization and DCT processing operations are performed. To accomplish this, information relative to the zeros is embedded in the process routine so that zeros may be inserted after the inverse quantization and DCT processing operations. The present embodiment thus represents another mode of operation which can be characterized as a serialized DCT process.

In particular, the embodiment of FIG. 24 begins in operation 2400 by extracting a plurality of non-zero coefficients upon which a non-zero coefficient is retrieved in operation 2402. Next, in operation 2404, inverse quantization is performed similar to that disclosed in reference to FIG. 21. Thereafter, an inverse DCT process is executed in a manner similar to that set forth hereinabove in FIG. 22. It should be noted that the inverse DCT process is carried out only on coefficients eligible. See operation 2406. Finally, the zeros are handled in operation 2408.

In still another embodiment, the present invention employs an additional procedure upon obtaining each set of n bits in order to effect more efficient processing. In particular, such procedure entails effectively inputting the n bits into a hardware processor in order to process the sets of n bits in a manner that best exploits the particular architecture of the hardware processor.

Figure 25:
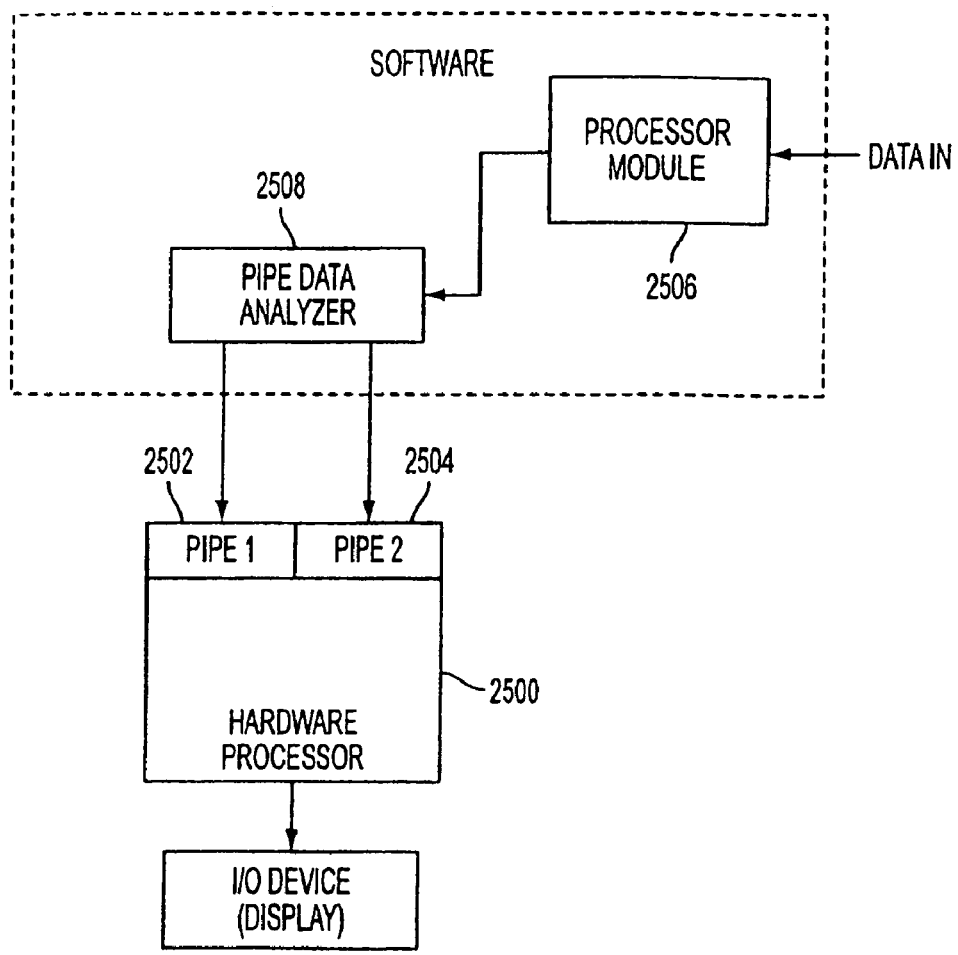
FIG. 25 illustrates a hardware processor of the present invention.

FIG. 25 shows a hardware processor 2500, or central processing unit, which receives data by way of a software-governed method. It should be understood that such method may also be executed by hardware, or even a portion of the hardware processor 2500. In order to receive such data for processing, the hardware processor 2500 includes at least two "pipelines" 2502 and 2504 which include inputs to separate components of the hardware processor. Such architecture is commonly known to those skilled in the art. For example, such hardware processor may take the form of an INTEL PENTIUM processor. Each of the components of the hardware processor are adapted to process the inputted data independently and even in different manners.

With continuing reference to FIG. 25, the software may include multiple components one of which includes a processor module 2506. At least one of the functions of the processor module 2506 is to obtain sets of n bits and optionally process them using the various methods set forth hereinabove. In addition to the processor module 2506, a pipe data analyzer 2508 may be employed to feed each set of bits to the pipelines 2502 and 2504 of the hardware processor 2500, Which of the two or more pipelines to which the pipe data analyzer 2508 sends each set of bits may depend on various factors. For example, each set of bits may be directed to the pipelines 2502 and 2504 of the hardware processor 2500 based on which pipeline affords most efficient use of the hardware processor 2500. In the alternative, the pipe data analyzer 2508 may direct each set of bits based on which of the pipelines 2502 and 2504 of the hardware processor 2500 is best suited to handle the associated processing.

Figure 26:
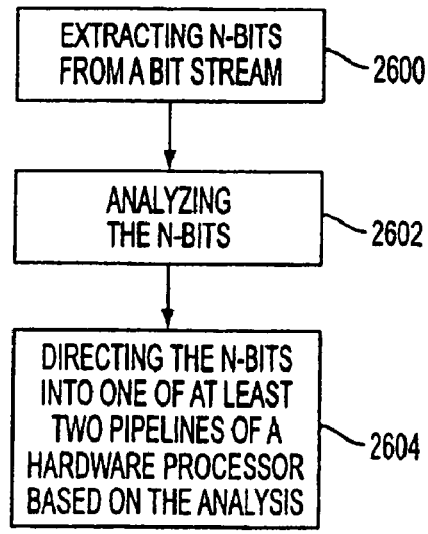
FIG. 26 is a schematic showing a hardware/software configuration for implementing a parallel processing technique in accordance with one embodiment of the present invention.

FIG. 26 illustrates a method associated with the hardware of FIG. 25. As shown, the method begins in operation 2600 by the processor module 2506 extracting sets of bits, or components, from an input bit stream. Next, in operation 2602, the components of the input bit stream are analyzed by the pipe data analyzer 2508. Based on such analysis, the components of the input bit stream are directed into one of the pipelines for processing purposes. In one embodiment, the components of the input bit stream may be directed into one of the pipelines based on which pipeline is more suitable for processing the components, as indicated by the analysis. In any embodiment, an increase in efficiency is achieved during processing.

While this invention has been described in terms of several preferred embodiments, it is contemplated that alternatives, modifications, permutations, and equivalents thereof will become apparent to those skilled in the art upon a reading of the specification and study of the drawings, It is therefore intended that the true spirit and scope of the present include all such alternatives, modifications, permutations, and equivalents.

What is claimed is:

1. A method for decompressing compressed video data in a processor having at least two pipelines, comprising:
   obtaining a plurality of raw data bits from a compressed video data stream;
   extracting one or more components from said plurality of raw data bits by analyzing said plurality of raw data bits in a look-up table; and
   directing each component into one of the pipelines for processing purposes based on the analysis.

2. The method as set forth in claim 1, wherein each component is directed into said one of the pipelines based on which pipeline is more suitable for processing the component.

3. A computer readable medium embodied on a computer readable medium for decompressing compressed video data in a processor having at least two pipelines, comprising:
   a code segment for obtaining a plurality of raw data bits from a compressed video data stream;
   extracting one or more components from said plurality of raw data bits by analyzing said plurality of raw data bits in a look-up table; and
   a code segment for directing each component into one of the pipelines for processing purposes based on the analysis.

4. The computer program as set forth in claim 3, wherein each component is directed into said one of the pipelines based on which pipeline is more suitable for processing the component.

5. A system for decompressing compressed video data in a processor for increased efficiency, comprising:
   a processor module for extracting a plurality of components from compressed video data using a look-up table;
   a central processing unit having at least two pipelines for receiving the components of the compressed video data for processing purposes; and
   a pipe analyzer coupled between the processor module and the central processing unit for analyzing the components of the compressed video data and directing the components of the compressed video data into one of the pipelines of the central processing unit based on the analysis.

6. The system as set forth in claim 5, wherein the pipe analyzer directs each component into one of the pipelines based on which pipeline is more suitable for processing the component.

7. An apparatus comprising:
   a microprocessor having a plurality of pipelines;
   memory;
   a communication adapter, capable of transmitting and receiving data over a communication network;
   a microphone, speaker, and a display device; and
   logic encoded in a tangible medium which when executed is operable to decompress compressed video data received from the communication network utilizing a look-up table to analyze components of said compressed video data and sending such components down selected ones of said plurality of pipelines.

8. An apparatus as set forth in claim 7 wherein said display device is a touch-screen display device.

* * * * *